United States Patent
Serrano et al.

(10) Patent No.: US 10,417,304 B2
(45) Date of Patent: Sep. 17, 2019

(54) DUAL PHASE MATRIX-VECTOR MULTIPLICATION SYSTEM

(71) Applicant: International Business Machines Corporation, Armonk, NY (US)

(72) Inventors: Mauricio J. Serrano, Bronx, NY (US); Manoj Kumar, Yorktown Heights, NY (US); Pratap Pattnaik, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 15/843,283

(22) Filed: Dec. 15, 2017

(65) Prior Publication Data

US 2019/0188239 A1    Jun. 20, 2019

(51) Int. Cl.
*G06F 17/16* (2006.01)
*G06E 1/04* (2006.01)

(52) U.S. Cl.
CPC ............ *G06F 17/16* (2013.01); *G06E 1/045* (2013.01)

(58) Field of Classification Search
CPC ...................................................... G06F 17/16
See application file for complete search history.

(56) References Cited

U.S. PATENT DOCUMENTS

| | | | |
|---|---|---|---|
| 9,697,176 B2 | 7/2017 | Daga et al. | |
| 2011/0040821 A1* | 2/2011 | Eichenberger | G06F 9/30014 708/607 |
| 2015/0160371 A1* | 6/2015 | Jonsthovel | G06F 17/16 703/2 |
| 2017/0060958 A1 | 3/2017 | Van Rest et al. | |
| 2017/0169326 A1 | 6/2017 | Diamos et al. | |
| 2018/0189638 A1* | 7/2018 | Nurvitadhi | G06N 3/063 |
| 2019/0012296 A1* | 1/2019 | Hsieh | G06F 17/16 |

OTHER PUBLICATIONS

Greathouse, J. L. et al.; "Efficient Spare Matrix-Vector Multiplication on GPUs using the CSR Storage Format"; SC'14: International Conference for High Performance Computing, Networking, Storage and Analysis; 2014; pp. 769-780.

(Continued)

*Primary Examiner* — Chuong D Ngo
(74) *Attorney, Agent, or Firm* — Scully, Scott, Murphy & Presser, P.C.; Daniel P. Morris, Esq.

(57) ABSTRACT

Methods and systems for multiplying a matrix and a vector are described. In an example, the vector may be partitioned into a plurality of vector partitions. The matrix may be partitioned into a plurality of matrix partitions. A plurality of threads may be scheduled to multiply each matrix partition with corresponding vector partition to determine intermediate elements. Intermediate elements determined by each thread may be stored in a local buffer assigned to the corresponding thread. Intermediate elements may be copied from a particular buffer to a memory in response to the particular buffer being full. Upon completion of the plurality of threads, the intermediate elements copied to the memory may be aggregated to generate an output vector that may be a result of multiplication between the matrix and the vector.

20 Claims, 5 Drawing Sheets

(56) References Cited

OTHER PUBLICATIONS

Ashari, A. et al.; "Fast Sparse Matrix-Vector Multiplication on GPUs for Graph Applications"; SC'14: International Conference for High Performance Computing, Networking, Storage and Analysis; 2014; pp. 781-792.
Anonymous; "Efficient Accelerators for Matrix Multiplication in Machine Learning"; http://ip.com/IPCOM/000243676D; Oct. 9, 2015; pp. 1-3.
IBM; "Sparse Matrix-Vector Multiplication on Processors with Small Memory Footprints"; http://ip.com/IPCOM/000184518D; Jun. 29, 2009; pp. 1-5.
Silvestri, F. et al.; "Method and System for Learning Collective Embedding Spaces to Complete Weakly-Engaged User Profiles"; http://ip.com/IPCOM/000239496D; Nov. 12, 2014; pp. 1-6.

* cited by examiner

```
01 Procedure SpMSpV_Phase1(A,X,global):
02 for every nonzero entry (col) in X do in parallel
03   for (edge = numEdges[col];
04        edge < numEdges[col+1]; edge++) {
05     row = endNode[edge];
06     index = row >> log2BucketSize; // bucket index
07     bucket = &bucket_array[index]; // bucket info
08     pointer = bucket->current;     // current entry
09     pointer->row  = row;
10     pointer->data = x[col] * edgeWeight[edge];
11     bucket->current = pointer + 1;
12     if (pointer == bucket->limit) {// flush bucket
13        gpoint = _sync_fetch_and_add(&global[index],
14                      bucket->limit-bucket->start);
15        for (p=bucket->start;p <= bucket->limit;p++)
16           *gpoint++ = *p;
17        bucket->current = bucket->start;
18     }
19   }
20 }
21 for every thread T do in parallel
22   for (index = 0; index < NUM_BUCKETS; index++) {
23     bucket = &bucket_array[bucket];// bucket info
24     s  = bucket->current - bucket->start;
25     if (s != 0) {
26        gpoint=_sync_fetch_and_add(&global[index],s);
28        for (p=bucket->start; p<bucket->current;p++)
29           *gpoint++ = *p;
30        bucket->current = bucket->start ;
31     }
32   }
33 }
```
— 301

```
01 Procedure SpMSpV_Phase2(global,Y):
02 for every  bucket do in parallel
03    for (row=row_initial[bucket];
04         row < row_end[bucket]; row++)
05       Y[row] = 0;
06    for (pointer = global_start[bucket];
07         pointer < global[bucket]; pointer++)
09       Y[pointer->row] += pointer->data;
09    global[bucket] = global_start[bucket];
10 }
```
— 302

FIG. 3

DUAL PHASE MATRIX-VECTOR MULTIPLICATION SYSTEM

FIELD

The present application relates generally to computers, and computer applications, and more particularly to computer-implemented methods and systems for matrix-vector multiplications.

BACKGROUND

In machine learning platforms, cognitive applications often rely on large graph analytics. Typically, large graphs are highly sparse and represented as sparse matrices (adjacency matrix) in cognitive applications. Multiplication of these sparse matrices with sparse vectors is a very common operation in cognitive applications. Modern multi-core, multi-threaded processors incur substantial synchronization overhead in sparse-matrix sparse vector implementation.

SUMMARY

In some examples, methods for determining an output vector associated with a multiplication between a matrix and a vector are described. The methods may include receiving, by a processor, input matrix data that corresponds to an input matrix. The methods may further include receiving, by the processor, input vector data that corresponds to an input vector. The methods may further include partitioning, by the processor, the input vector data into at least a first vector partition and a second vector partition. The first vector partition may correspond to a first range of elements in the input vector, and the second vector partition may correspond to a second range of elements in the input vector. The methods may further include partitioning, by the processor, the input matrix data into at least a first matrix partition and a second matrix partition. The first matrix partition may correspond to a first range of columns of the input matrix, and the second matrix partition may correspond to a second range of columns of the input matrix. The methods may further include executing, by the processor, a first thread to determine a set of first intermediate elements. The set of first intermediate elements may be a result of a multiplication between the first matrix partition and the first vector partition. The methods may further include in response to determination of each first intermediate element, storing, by the processor, the determined first intermediate element into a first buffer assigned to the first thread. The methods may further include executing, by the processor, a second thread to determine a set of second intermediate elements. The set of second intermediate elements may be a result of a multiplication between the second matrix partition and the second vector partition. The methods may further include in response to determination of each second intermediate element, storing, by the processor, the determined second intermediate element into a second buffer assigned to the second thread. The methods may further include copying, by the processor, at least a subset of the first intermediate elements from the first buffer to a memory. The methods may further include copying, by the processor, at least a subset of the second intermediate elements from the second buffer to the memory. The methods may further include aggregating, by the processor, the first intermediate elements and the second intermediate elements stored in the memory to generate output vector data that corresponds to an output vector. The output vector may be a result of multiplication between the input matrix and the input vector.

In some examples, systems effective to determine an output vector associated with a multiplication between a matrix and a vector are generally described. An example system may include a memory, a first buffer, a second buffer, and a processor configured to be in communication with the memory, the first buffer, and the second buffer. The system may further include a scaling module configured to be in communication with the processor, the first buffer, and the second buffer. The system may further include an aggregation module configured to be in communication with the processor and the memory. The processor may be configured to receive input matrix data that corresponds to an input matrix. The processor may be further configured to receive input vector data that corresponds to an input vector. The processor may be further configured to partition the input vector data into at least a first vector partition and a second vector partition. The first vector partition may correspond to a first range of elements in the input vector, and the second vector partition may correspond to a second range of elements in the input vector. The processor may be further configured to partition the input matrix data into at least a first matrix partition and a second matrix partition. The first matrix partition may correspond to a first range of columns of the input matrix, and the second matrix partition may correspond to a second range of columns of the input matrix. The scaling module may be configured to execute a first thread to determine a set of first intermediate elements. The set of first intermediate elements may be a result of a multiplication between the first matrix partition and the first vector partition. The first buffer may be assigned to the first thread. The scaling module may be further configured to, in response to determination of each first intermediate element, store the determined first intermediate element into the first buffer. The scaling module may be further configured to execute a second thread to determine a set of second intermediate elements. The set of second intermediate elements may be a result of a multiplication between the second matrix partition and the second vector partition. The second buffer may be assigned to the second thread. The scaling module may be configured to, in response to determination of each second intermediate element, store the determined second intermediate element into the second buffer. The processor may be further configured to copy at least a subset of the first intermediate elements from the first buffer to the memory. The processor may be further configured to copy at least a subset of the second intermediate elements from the second buffer to the memory. The aggregation module may be configured to aggregate the first intermediate elements and the second intermediate elements stored in the memory to generate output vector data that corresponds to an output vector. The output vector may be a result of multiplication between the input matrix and the input vector.

In some examples, computer program products for determining an output vector associated with a multiplication between a matrix and a vector are generally described. A computer program product may include a computer readable storage medium having program instructions embodied therewith, and the program instructions may be executable by a device to cause the device to receive input matrix data that corresponds to an input matrix. The program instructions may be further executable by the device to cause the device to receive input vector data that corresponds to an input vector. The program instructions may be further executable by the device to cause the device to partition the input vector data into at least a first vector partition and a second vector partition. The first vector partition may correspond to a first range of elements in the input vector, and the second vector partition may correspond to a second range of elements in the input vector. The program instructions may be further executable by the device to cause the device to partition the input matrix data into at least a first matrix partition and a second matrix partition. The first matrix partition may correspond to a first range of columns of the input matrix, and the second matrix partition may correspond to a second range of columns of the input matrix. The program instructions may be further executable by the device to cause the device to execute a first thread to determine a set of first intermediate elements. The set of first intermediate elements may be a result of a multiplication between the first matrix partition and the first vector partition. The program instructions may be further executable by the device to cause the device to, in response to determination of each first intermediate element, store the determined first intermediate element into a first buffer assigned to the first thread. The program instructions may be further executable by the device to cause the device to execute a second thread to determine a set of second intermediate elements. The set of second intermediate elements may be a result of a multiplication between the second matrix partition and the second vector partition. The program instructions may be further executable by the device to cause the device to, in response to determination of each second intermediate element, store the determined second intermediate element into a second buffer assigned to the second thread. The program instructions may be further executable by the device to cause the device to copy at least a subset of the first intermediate elements from the first buffer to a memory. The program instructions may be further executable by the device to cause the device to copy at least a subset of the second intermediate elements from the second buffer to the memory. The program instructions may be further executable by the device to cause the device to aggregate the first intermediate elements and the second intermediate elements stored in the memory to generate output vector data that corresponds to an output vector. The output vector may be a result of multiplication between the input matrix and the input vector.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 3 illustrates a set of example instructions that can be executed to implement a dual phase matrix-vector multiplication system.

DETAILED DESCRIPTION

Briefly stated, methods and systems for multiplying a matrix and a vector are described. In an example, the vector may be partitioned into a plurality of vector partitions. The matrix may be partitioned into a plurality of matrix partitions. A plurality of threads may be scheduled to multiply each matrix partition with corresponding vector partition to determine intermediate elements. Intermediate elements determined by each thread may be stored in a local buffer assigned to the corresponding thread. Intermediate elements may be copied from a particular buffer to a memory in response to the particular buffer being full. Upon completion of the plurality of threads, the intermediate elements copied to the memory may be aggregated to generate an output vector that may be a result of multiplication between the matrix and the vector.

Figure 1:
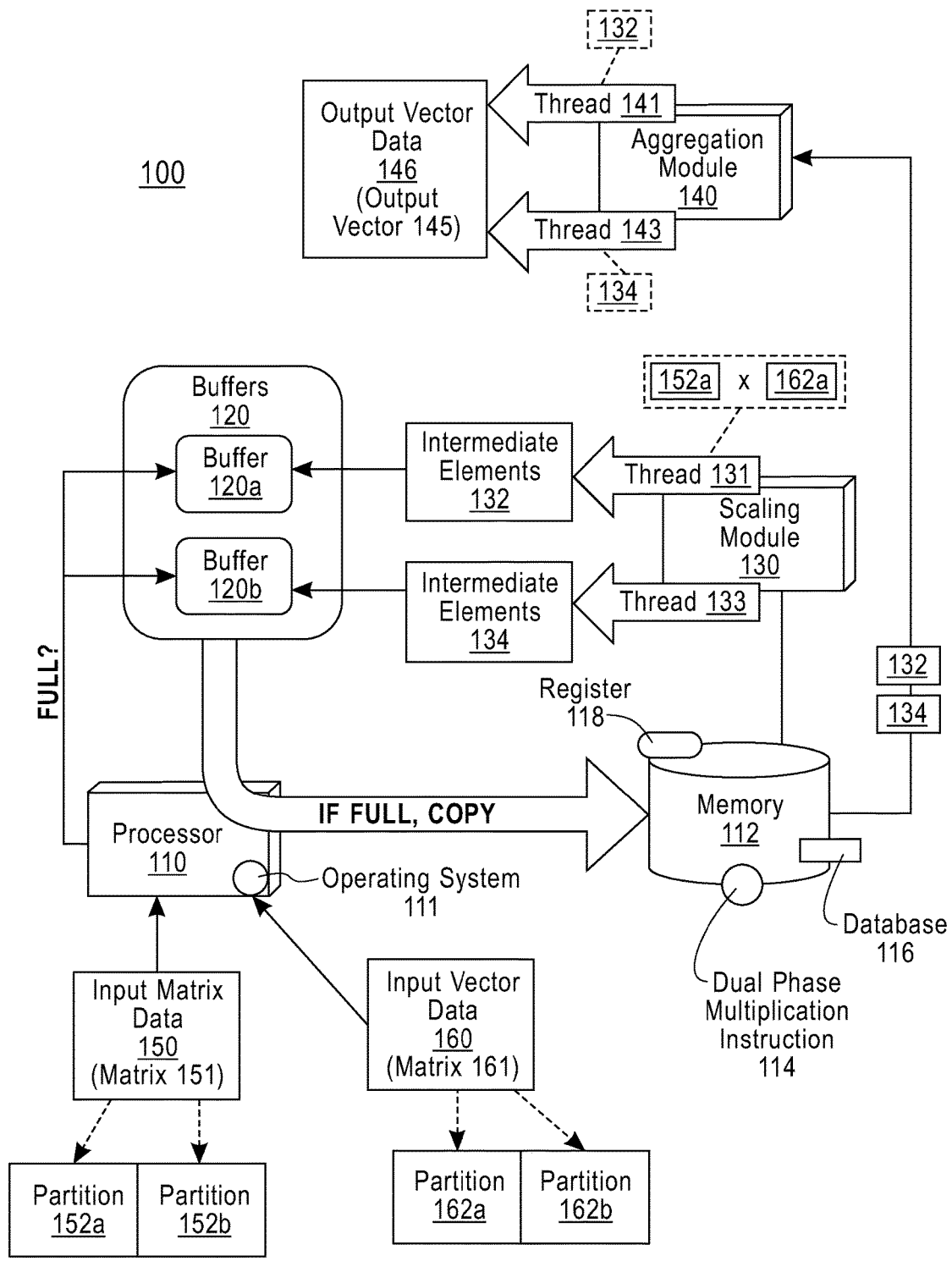
FIG. 1 illustrates an example computer system that can be utilized to implement dual phase matrix-vector multiplication system.

FIG. 1 illustrates an example computer system 100 that can be utilized to implement a dual phase matrix-vector multiplication system, arranged in accordance with at least some embodiments described herein. In an example shown in FIG. 1, computer system 100 may include a processor 110, a memory 112, one or more buffers 120 (including buffer 120a, 120b), a scaling module 130, and/or an aggregation module 140. Processor 110, memory 112, buffers 120, scaling module 130, and aggregation module 140 may be configured to be in communication with each other. In some examples, processor 110, memory 112, buffers 120, scaling module 130, and aggregation module 140 may be housed, or distributed, in a same housing and/or a computer device. In some examples, processor 110, memory 112, buffers 120, scaling module 130, and aggregation module 140 may be housed, or distributed, in two or more different housings and/or computer devices. For example, processor 110, memory 112, and buffers 120 may be distributed in a first device while scaling module 130 and aggregation module 140 may be distributed in a second device. In another example, processor 110 may be a processor of a first device and, scaling module 130 and aggregation module 140 may be components of a second device different from the first device.

In another embodiment, Processor 110, memory 112, buffers 120, scaling module 130, and aggregation module 140 may each be hardware components or hardware modules of computer system 100. In some examples, scaling module 130 and aggregation module 140 may each be a hardware component, or hardware modules, of processor 110. In some examples, processor 110 may be a central processing unit of a computer device. In some examples, processor 110 may control operations of scaling module 130 and aggregation module 140. In some examples, scaling module 130 and aggregation module 140 may each include electronic components, such as integrated circuits. In some examples, scaling module 130 and aggregation module 140 may each be processors configured to perform respective operations. In some examples, scaling module 130 and aggregation module 140 may each be an embedded system, programmable devices such as field-programmable-gate-array (FPGA), or other types of application specific integrated circuits (ASIC), etc. In some examples, scaling module 130 and aggregation module 140 may each be software modules that may be implemented with processor 110.

Memory 112 may be configured to store a dual phase multiplication instruction 114. Dual phase multiplication instruction 114 may include one or more set of instructions to facilitate implementation of computer system 100. In some examples, dual phase multiplication instruction 114 may include instructions to apply matrix operations to inputs received at computer system 100. In some examples, dual phase multiplication instruction 114 may indicate one or more conditions or constraints associated with an implementation of computer system 100. Processor 110, scaling module 130 and aggregation module 140 may each retrieve dual phase multiplication instruction 114 from memory 112, and may each execute dual phase multiplication instruction 114 to facilitate implementation of computer system 100.

In some examples, processor 110 may be a multiprocessor including more than one processor cores. Each processor core may be configured to operate at respective frequencies and may be assign to execute respective set of threads. Each processor core may further be configured to be in communication with one or more caches of respective size. For example, a first processor core of processor 110 may be configured to a first level one (L1) cache, a first level two (L2) cache, and a first level three (L3) cache, while a second processor core may be configured to be in communication with a second L1 cache, a second L2 cache, and a second L3 cache. In some examples, more than one processor cores may have access to a shared cache, such as a L3 cache. In some examples, L1 caches may be embedded in one or more processor cores. In examples where processor 110 may be a multiprocessor, processor 110, scaling module 130 and aggregation module 140 may each be a part of a respective processor core. In another example, processor 110 may be a single core processor configured to execute one or more threads such as by utilizing hyperthreading techniques.

In an example, processor 110 may receive input matrix data 150 and input vector data 160. In some examples, input matrix data 150 and input vector data 160 may be received from a computing device outside of system 100. In some examples, input matrix data 150 and input vector data 160 may be stored in memory 112, such that processor 110 may retrieve input matrix data 150 and input vector data 160 from memory 112. Input matrix data 150, when processed (such as by processor 110), may be output as a matrix 151 (or "input matrix 151"), where matrix 151 may include a plurality of elements arranged in a plurality of rows and columns. Input vector data 160, when processed (such as by processor 110), may be output as a vector 161 (or "input vector 161"), where vector 161 may be a plurality of elements arranged in a single row or a single column. In an example, matrix 151 may be a sparse matrix, or a matrix where a majority of elements are zeroes, and vector 161 may be a sparse vector, or a vector where a majority of elements are zeroes.

Processor 110 may be configured to partition input vector data 160 into one or more vector partitions, such as vector partitions (or "partitions") 162a, 162b, etc. Each vector partition may correspond to a respective range of elements of vector 161. For example, vector 161 may include one billion elements, and processor 110 may partition vector 161 into one million vector partitions, where each vector partition may include one thousand elements. Similarly, processor 110 may be configured to partition input matrix data 150 into one or more matrix partitions, such as matrix partitions (or "partitions") 152a, 152b, etc. Each matrix partition of input matrix data 150 may correspond to a respective range of columns of matrix 151. For example, matrix 151 may include one billion columns and one billion rows, and processor 110 may partition matrix 151 into one million matrix partitions, where each matrix partition may include one thousand columns and one billion rows. Processor 110 may be configured to store matrix partitions 152a, 152b, and vector partitions 162a, 162b in memory 112.

Processor 110 may be configured to execute an operating system 111. Processor 110 may execute operating system 111 to manage, and/or schedule, one or more threads to be executed by processor 110, scaling module 130, and/or aggregation module 140. In the example shown in FIG. 1, processor 110 may schedule scaling module 130 to execute threads 131, 133, and may schedule aggregation module 140 to execute threads 141, 143. Processor 110 may further execute operating system 111 to assign respective buffer to threads scheduled to be executed by scaling module 130. In the example shown in FIG. 1, buffer 120a may be assigned to thread 131 and buffer 120b may be assigned to thread 133. Each buffer among buffers 120 may be a thread-local allocation buffer (e.g., a local, or private, buffer assigned to be used by a particular thread). Processor 110 may be configured to control, monitor, and/or manage buffers 120. For example, processor 110 may be configured to detect whether buffers 120 are full (e.g., filled with data). Processor 110 may be further configured to manage a database 116 that may be a part of memory 112, where database 116 may include contents effective to indicate assignments of buffers to corresponding threads. In some examples, buffers 120 may be parts of one or more caches configured to be in communication with processor 110. Each buffer among buffers 120 may be of a same or different size, and a size of each buffer may be a fixed size.

Each thread executed by scaling module 130 may include instructions to perform scaling of matrices, such as multiplication and/or division of matrices. For example, scaling module 130 may execute threads to perform multiplication on matrix 151 and vector 161. In the example, scaling module 130 may perform multiplication on one or more pairs of matrix partition and vector partition. For example, scaling module 130 may execute thread 131 to perform a multiplication of matrix partition 152a and vector partition 162a. Multiplication of matrix partition 152a and vector partition 162a may result in a set of intermediate elements 132, where intermediate elements 132 may be elements of a row vector, or a column vector. During execution of thread 131, upon a determination of each element among intermediate elements 132, the determined intermediate element may be stored in buffer 120a. For example, thread 131 may determine a first intermediate element and store the first intermediate element in buffer 120a prior to a determination of a second intermediate element. In other words, thread 131 may continue to store determined elements in buffer 120a without waiting for every element among intermediate elements 132 to be determined, and/or without waiting for thread 131 to finish execution. Storage in buffer 120a may be implemented as a queue, or in a first-in-first-out manner, such that thread 131 may store individual elements of intermediate elements 132 upon determination and without completing execution of thread 131.

Similarly, scaling module 130 may execute thread 133 to perform a multiplication of matrix partition 152b and vector partition 162b. Multiplication of matrix partition 152b and vector partition 162b may result in a set of intermediate elements 134, where intermediate elements 134 may be elements of a row vector, or a column vector. During execution of thread 133, upon a determination of each element among intermediate elements 134, the determined intermediate element may be stored in buffer 120b. Storage in buffer 120b may be implemented as a queue, or in a first-in-first-out manner, such that thread 133 may store individual elements of intermediate elements 134 upon determination and without completing execution of thread 133.

As mentioned above, processor 110 may detect whether buffers 120 are full. In response to a detection that a buffer is full, processor 110 may identify a set of addresses in memory 112 that may be available. In an example, system 100 may further include a register 118, where register 118 may be configured to store a pointer that may indicate available memory spaces in memory 112. Processor 110 may identify the set of addresses in memory 112 using the pointer stored in register 118. In response to identifying the set of addresses, processor 110 may copy the data stored in the full buffer to the memory 112 at the set of address. After copying data stored in a full buffer to memory 112, processor 110 may flush the full buffer such that the same buffer may be used for subsequent outputs from a thread assigned to the buffer.

In some examples, threads 131, 133 may each include instructions to detect whether a corresponding buffer is full. For example, thread 131 may detect whether buffer 120a is full, and thread 133 may detect whether buffer 120b is full. In some examples, one or more buffer counters that correspond to buffers 120 may be stored in a L1 cache of processor 110, or in L1 cache of each processor core. The buffer counters may be counters configured to track storage capacity of buffers 120. Processor 110, and/or scaling module 130, may be configured to identify values indicated by the buffer counters in order to determine whether a buffer among buffers 120 is full. In some examples, buffer counters are located in a L1 cache to improve a performance of system 100 as buffer counters may require constant updating (e.g., updated upon each write operation performed on a buffer), while buffers 120 may be located in a L2, or a L3 cache.

In some examples, processor 110 may suspend, or may instruct scaling module to suspend, execution of a thread associated with the full buffer prior to identifying the set of addresses of memory 112. For example, processor 110 may detect that buffer 120a is full and, in response, suspend execution of thread 131. Processor 110 may identify the set of addresses in memory 112 and, in response, may copy data stored in buffer 120a to memory 112 at the identified set of addresses, and may update the pointer indicated by register 118. Upon updating the pointer indicated by register 118, processor 110 may resume, or may instruct scaling module 130 to resume, execution of thread 131. In some examples, in response to updating the pointer indicated by register 118, processor 110 may attempt to detect whether there is another buffer that may be full. If another buffer is detected as being full, processor 110 may identify a new set of addresses in memory 112 based on the updated pointer indicated by register 118, and may copy the data stored in the newly detected full buffer to memory 112 at the newly identify set of addresses in memory 112.

In some examples, memory 112 may include one or more sets of addresses that are allocated, or assigned, to each buffer among buffers 120. A number of addresses assigned to each buffer may be based on a size of the corresponding buffer. Database 116 stored in memory 112 may include data indicating assignments of addresses in memory 112 to buffers 120. Processor 110 may identify addresses in memory 112 based on the assignments indicated by database 116. Processor 110 may be further configured to determine whether memory 112 includes sufficient capacity to store contents copied from all buffers 120, such as by analyzing sizes of buffers 120.

In an example, processor 110 may detect that all intermediate elements 132 are determined and stored in buffer 120a, or may detect a completion of thread 131, even if buffer 120a may not be full. Processor 110 may identify a set of addressed using register 118, and may copy intermediate elements 132 from buffer 120a to memory 112 at the identified set of addresses. Processor 110 may continue to monitor threads scheduled to be executed by scaling module 130 to detect for any completion of threads.

Upon a completion go all threads relating to multiplication of input matrix data 150 and input vector data 160, processor 110 may copy all intermediate elements stored in buffers 120 to memory 112. Processor 110 may send a signal to aggregation module 140 to indicate a completion of all threads. Aggregation module 140 may receive the signal and, in response may retrieve intermediate elements 132, 134 stored in memory 112. Aggregation module 140 may be configured to execute threads 141, 143, to generate output vector data 146. Output vector 146, when processed (e.g., by processor 110), may output an output vector 145. Output vector 145 may be a row vector, or a column vector, that includes a same number of rows and/or columns as vector 161. Aggregation module 140 may determine each element of output vector 145 to generate output vector data 146. For example, aggregation module 140 may be configured to determine sum of intermediate elements in each corresponding row of intermediate elements 132, 134 (further described below). Output vector 145 may be a result of a multiplication of matrix 151 and vector 161.

Figure 2:
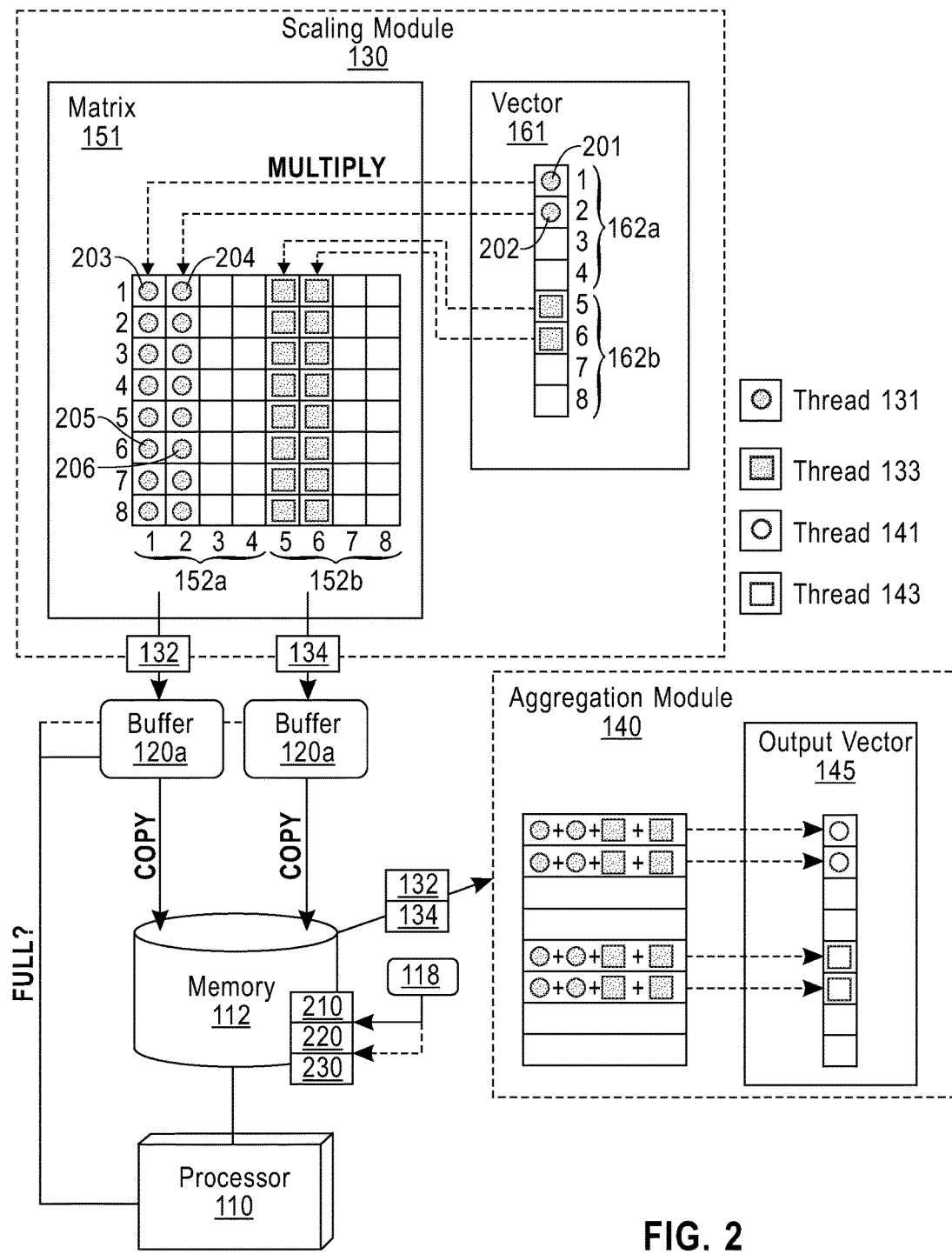
FIG. 2 illustrates the example computer system of FIG. 1 with additional detail relating to dual phase matrix-vector multiplication system.

FIG. 2 illustrates the example computer system 100 of FIG. 1 with additional detail relating to dual phase matrix-vector multiplication system, arranged in accordance with at least some embodiments described herein. FIG. 2 is substantially similar to computer system 100 of FIG. 1, with additional details. Those components in FIG. 2 that are labeled identically to components of FIG. 1 will not be described again for the purposes of clarity.

In an example shown in FIG. 2, matrix 151 may include eight rows and eight columns, and vector 161 may include eight rows and one column. Processor 110 may partition input vector data 160 into vector partitions 162a, 162b. In the example shown in FIG. 2, vector partition 162a may correspond to elements of rows one to four of vector 161, and vector partition 162b may correspond to elements of rows five to eight of vector 161. Similarly, processor 110 may partition input matrix data 150 into matrix partitions 152a, 152b. Matrix partition 152a may correspond to elements in columns one to four of matrix 151, and matrix partition 152b may correspond to elements in columns five to eight of matrix 151. In some examples, partitioning of input matrix data 150 may be based on vector partitions 162a, 162b. For example, processor 110 may identify one or more columns of matrix 151 that correspond to row indices of each vector partitions 162. In the example shown in FIG. 2, processor 110 may identify that columns one to four of matrix 151 correspond to rows one to four of vector 161 based on column indices of matrix 151 and row indices of vector 161. Similarly, processor may identify that columns five to eight of matrix 151 correspond to rows five to eight of vector 161. In another example, processor 110 may determine that each vector partition 162 includes four rows and, in response, partition matrix 151 into matrix partitions of four columns each.

Processor 110 may schedule thread 131 to multiply an element in row one of vector 161 with each element (rows one to eight) in column one of matrix 151, to generate a first subset of intermediate elements 132. Thread 131 may further multiply an element in row two of vector 161 with each element (rows one to eight) in column two of matrix 151, to generate a second subset of intermediate elements 132. Similarly, processor 110 may schedule thread 133 to multiply an element in row five of vector 161 with each element (rows one to eight) in column five of matrix 151, to generate a first subset of intermediate elements 134. Thread 133 may further multiply an element in row six of vector 161 with each element (rows one to eight) in column six of matrix 151, to generate a second subset of intermediate elements 134.

In some examples, threads 131, 132, may each include instructions to identify nonzero elements in vector 161. For example, thread 131 may include instructions to identify nonzero elements in vector partition 162a, such as the elements in row one and row two of vector 161. Similarly, thread 133 may include instructions to identify nonzero elements in vector partition 162b, such as the elements in row five and row six of vector 161. In some examples, threads 131, 133 may each identify nonzero elements in respective vector partitions 162 prior to a start of multiplying vector partitions 162 with matrix partitions 152. For example, thread 131 may identify a presence of nonzero elements in row one and row two of vector partition 162a and, in response, may identify column one and column two of matrix partition 152a based on the row indices of vector partition 162a. Thread 131 may multiply row one and row two of vector partition 162a with column one and column two of matrix partition 152a, respectively, and may determine that there is no need to perform multiplication of row three and row four of vector partition 162a with column three and column four of matrix partition 152a (since the results would be zeroes).

Thread 131 may determine elements of intermediate elements 132 sequentially. For example, thread 131 may multiply element 201 of vector 161 with element 203 of matrix 151, multiply element 202 of vector 161 with element 204 of matrix 151, then sum the results from the two multiplications to determine a first intermediate element. Thread 131 may continue to determine a second, third, and subsequent elements of intermediate elements 132. Processor 110 may implement a queue in each of buffers 120a, 120b, such that outputs from threads 131, 133, may be stored in buffers 120a, 120b, in a first-in-first-out manner. Processor 110 may monitor buffers 120 to detect whether a buffer is full, such as by assigning respective pointer to each buffer and monitoring a value of each assigned pointer. Using FIG. 2 as an example, buffer 120a may be assigned to thread 131 and may include a capacity to store six elements among intermediate elements 132. Thus, buffer 120a may become full upon storing a sixth intermediate element. Processor 110 may determine that buffer 120a is full, such as by identifying a value of a pointer assigned to buffer 120a. Buffer 120a may be full due to the first, second, third, fourth, fifth, and sixth intermediate element being stored in buffer 120a.

In response to detecting that buffer 120a is full, processor 110 may analyze a pointer value stored in register 118 to identify a set of addresses in memory 112 that may be utilized to store the contents of buffer 120a. In some examples, processor 110 may suspend execution of thread 131, such as by sending an interrupt signal to scaling module 130, in response to detecting that buffer 120a is full. In the example shown in FIG. 2, a pointer value indicated by register 118 may show that a set of addresses 210 are already in used, and a next set of addresses 220 are available. Processor 110 may identify set of addresses 220 and, in response, may copy contents of buffer 120a into memory 112 at set of addresses 220. Processor 110 may update the pointer value stored in register 118 to indicate that set of addresses 220 is being used, and a next available set of addresses is set of addresses 230. Processor 110 may also flush buffer 120a, such as by deleting all contents of buffer 120a. Processor 110 may send a signal to scaling module 130 to resume execution of thread 131, such that scaling module 130 may continue execution of thread 131 by determining a seventh intermediate element, and subsequent intermediate elements 132.

Processor 110 may also detect a completion of a thread being executed by scaling module 130. In some examples, scaling module 130 may send signals to processor 110 to indicate a completion of one of more threads. In an example, scaling module 130 may send a signal to processor 110 to indicate a completion of threads 131, 133. Processor 110 may receive the signal and, in response, may identify available addresses in memory 112. Upon identification of available addresses in memory 112, processor 110 may copy contents, such as intermediate elements 132, 134, from buffers 120a, 120b to memory 112.

Upon copying contents from buffers 120a, 120b to memory 112, processor 110 may send a signal to aggregation module 140 to instruct aggregation module 140 to execute threads 141, 143, to determine output vector data 146. Aggregation module 140 may retrieve intermediate elements 132, 134 from memory 112. Aggregation module 140 may determine output vector 146 by determining sums of elements in each row of intermediate elements 132, 134. For example, aggregation module 140 may determine a first element of output vector 146 by determining a sum of elements in the first row of intermediate elements 132 with the elements in the first row of intermediate elements 134. Aggregation module 140 may continue to determine the sum for each row of intermediate elements 132, 134, in order to determine output vector data 146.

FIG. 3 illustrates a set of example instructions that can be executed to implement a dual phase matrix-vector multiplication system. FIG. 3 is substantially similar to computer system 100 of FIG. 1 and FIG. 2, with additional details. Those components in FIG. 3 that are labeled identically to components of FIG. 1 and FIG. 2 will not be described again for the purposes of clarity.

FIG. 3 depicts sets of instructions 301, that may correspond to a first phase of an implementation of system 100, and a set of instructions 302 may correspond to a second phase of the implementation of system 100. The first phase of an implementation of system 100 may include executing threads to multiply partitions of an input matrix with partitions of an input vector. The second phase of the implementation of system 100 may include executing threads to aggregate the results from the first phase in order to generate an output vector that may be a product of the input matrix multiplied with the input vector. The second phase may begin in response to a completion of the first phase. For example, the first phase may be completed when execution of all threads in the first phase are complete. Instructions 301, 302 may be executed by processor 110 and/or scaling module 130 (shown in FIGS. 1, 2), and instructions 302 may be executed by processor 110 and/or aggregation module 140 (shown in FIGS. 1, 2).

In some examples, the first phase proceeds by scanning the columns of an input matrix, and each thread may be assigned to scan a small portion of an input vector to identify nonzero entries in the input vector that corresponds to particular columns of the input matrix. Each thread may access the input vector at a particular column "col" (lines "03" and "04" of instruction 301, and the corresponding CSC matrix edge data expressed as a pair (row,weight), producing a result (row,product=weight*x[col]). Each thread may maintain a collection of fixed capacity buckets to defer irregular accesses. Each bucket may capture accesses to a limited section of the output vector. The bucket index may be obtained by a simple division, such as "bucket=row/number_of_rows_per_bucket". Then the thread inserts the pair (row,product) into the corresponding bucket. The number of rows per bucket can be made a power of two, so the division may be transformed into a less-expensive shift operation. Each thread may detect when the fixed capacity bucket is full, and copies the contents of the bucket to a global array for the corresponding row bucket. Each thread may obtain the pointer where the contents of the thread bucket will be dumped and advances that pointer by the amount needed to dump the bucket. At the end of the first phase, remaining elements stored in the thread buckets are copied in the corresponding global array for the corresponding row bucket. Once the first phase is completed, the second phase may begin. Each thread in the second phase is assigned a corresponding row bucket, and assigned the global array corresponding to the bucket, which may correspond to a portion of the output vector "Y". Each thread may scan the global array which contains pairs (row,data) and reduces the corresponding row in the output vector.

Focusing on instructions 301, an input matrix "A" may be represented in a compressed sparse column (CSC) format that uses three arrays. The three arrays are labeled as "numEdges", "endNode", and "edgeWeight" as shown in lines "03" to "10" in instructions 301. In some examples, an input vector (e.g., "X" as shown in instructions 301) may be represented as a bitvector that describes positions of nonzero elements combined with a dense array where nonzero elements may be stored. Each thread in the first phase of the implementation is assigned to a private bucket (e.g., a buffer), or an array, which is labeled as "bucket_array" as shown in line "07" of instruction 301. In line "02" of instruction 301, each thread may scan a portion of input vector "X", and may select corresponding nonzero columns ("col" in instructions 301) of input matrix "A". Each thread may scan a list of edges corresponding to the column of "A", and each edge may point to a row (as shown in line "05") in the CSC representation. A bucket may be identified by a shift operation (line "06") and a tuple (row,data) may be inserted in the identified bucket. If the bucket overflows (e.g., a full buffer, shown in line "12"), then contents in the bucket may be copied to a global array (e.g., main memory) for the buckets, and the bucket is flushed, or reinitialized to empty. A synchronized "fetch_and_add" may be used to atomically advance a pointer that points to the memory. Finally, in lines 21-30, after vector "X" has been completely scanned, the remaining information in the buckets is copied to the corresponding bucket array, or to the memory.

Instruction 302 may be executed by a processor, and/or an aggregation module, to aggregate results from the first phase to determine an output vector "Y", where "Y" may be a result of a multiplication of input matrix "A" and input vector "X". Each thread in the second phase of the implementation may be dynamically assigned a global array bucket, and may be executed to determine a portion of the output vector, delimited by rows in the range (row_init[bucket],row_end[bucket]) as shown in lines "03" and "04" of instructions 302. Initially the thread may clear the portion of the output vector. If bitmaps are used, the corresponding bit maps positions may be cleared. Each thread may scan the tuples (row,data) and update the vector in its corresponding position. Each thread may also check the contents of the bitmap at the row position. If a bit is clear, then the thread will set the bit and install y[row]=data, otherwise the thread may update the position y[row]. At the end of execution, the global bucket array may be reinitialized to an empty state.

In some examples, the input matrix "A" may be preprocessed to estimate a maximum number of nonzeros that a global bucket array could hold. The number of entries in each bucket is the sum of the non-zero elements in the rows assigned to the bucket, occurring in columns where the input vector is not zero. An upper bound on bucket size for each thread may be used in order to determine whether the input vector is a dense vector (as opposed to a sparse vector). Each thread may compute a maximum number of elements that a bucket could hold for a portion of the input vector. The results may be aggregated by the threads and thus, the size of the global arrays may be adequate to store nonzero elements for the matrix multiplication with a dense vector.

In some examples, system 100 may be optimized to reduce cache footprint of each bucket. In an example, if each bucket spans a maximum of sixty-four thousand entries (or rows) in an address space, then it may be sufficient to store the 16-bit least significant bits for "row" in the tuple (row, data), since the full row information may be reconstructed from the bucket position and the least-significant bits stored in the bucket. Using a 16-bit for the row index may introduce misalignment issues. In order to compute only one array index for the bucket, packed bucket entries containing the tuple (row,data) may be used, where row is a 16-bit integer, and data could be of any arbitrary size. The misalignment issues may be solved by using separate arrays, but the number of instructions required to manipulate the data may become larger, increasing the path length. Also, a lower cache footprint may be achieved by packing all data in a single update instead of using separate arrays.

During the first phase of the implementation, sections of the input vector may be dynamically assigned to each thread for better load balancing. Thus, there may be no preprocessing to partition shared storage for intermediate elements produced from the first phase. Each thread may have its own private small partitions, one partition for each thread used in phase 2, which may be periodically merged with shared partitions, and one for each thread for phase 2. As such, the synchronization overhead for shared storage may be reduced. Instead of relying on a sparse accumulator in conventional techniques, the present disclosure utilizes a system that merges from the global shared storage for intermediate outputs.

In some examples, the bucket counters may be maintained in L1 caches, as the buffer counters are updated continuously by each thread. Bucket information may be written in the first phase of the algorithm. In most architectures, writes are almost free since they are enqueued for writing in L2 in store queues, and processors are not blocked (unless queues are full). Typically, L1 cache is write-through, thus L1 is not polluted by these writes. Efficiency may be optimized as long as the number of buckets multiplied by the cache line size is less than a portion of the L3 cache size.

In some examples, multiple sockets may be exploited and thus, system 100 may need to be non-uniform memory access (NUMA) aware. Different techniques may be utilized based on the number of nonzeros involved in the implementation of system 100. In an example, two NUMA sockets may be used, and a number of nonzeros that the implementation will involve may be significantly higher than the number of nonzeros in the input vector. The input vector may be partitioned in the two sockets. The input matrix may be partitioned per socket, with each socket getting a similar number of nonzeros of the input matrix. The partition may be by rows, where each partition may retain the same number of columns as the input matrix (e.g., a one dimensional (1-D) matrix row partition). Each partition may contain approximately the same number of nonzeros, thus the number of rows in each partition may not be similar to other partitions. In order to obtain these partitions, the original CSC matrix may be preprocessed into multiple CSC matrices, and split at the selected row boundaries. Each thread from a socket may have its own set of thread bins. The threads in the first phase may process the nonzeros of each 1-D matrix partitioning. If threads in a socket have finished processing the 1-D partition, then the threads may steal work in a different socket which has not yet been finished. The global bin array produced by the first phase may also be 1-D allocated, with each socket getting a roughly equivalent number of nonzeros per socket. Threads in the second phase may follow a similar strategy of memory affinity, producing a portion of the output vector.

Another technique to exploit the multiple sockets may be, partitioning the CSC represented input matrix into 1-D chunks, but by columns. There may be no need to split the original CSC matrix into multiple CSC partitions, but rather each partition may use a portion of the columns in the original CSC matrix. Each socket then will process a portion of the input vector using its corresponding CSC partition, depositing results in the thread local bins. Then results will then deposited in the corresponding global bins.

Since thread synchronization may be expensive, the bucket size needs to be sufficiently large to reduce the number of synchronizations. Bucket sizes may be chosen in order to amortize the synchronization cost. The system in accordance with the present disclosure may require synchronization when there is a need to advance a pointer (e.g., when identifying addresses in main memory). The copy operations in lines 15,16 of instructions 301 may also be optimized, and the global write operation in line 16 of instructions 301 may also be optimized. For example, non-temporal writes or cache zero to reduce cache pollution and reduce write bandwidth requirements may be utilized. The choice of the number of rows per bucket is typically dictated by the second phase of the implementation. In the second phase, each thread updates sections of the output vector. If the portion of the vector that needs to be updated to a portion of the L1 cache is limited, then there is a high-chance of cache reuse if there are not patterns in the row portions of the bucket. Also, streaming the global array using non-temporal prefetching stream may significantly reduces cache pollution in the L1 cache.

A system in accordance with the present disclosure may benefit systems configured to perform large scale graph analytics. Using a graphical representation of a social networking platform as an example, each user among the social networking platform may be a node, and each connection between two users may be an edge. If the social networking platform includes two billion users, an adjacency matrix representing the graph of the connections among the users may be large scale, such as a matrix including two billion rows and two billion columns. Further, a majority of the users may not be connected to each other, thus causing the adjacency matrix to be a sparse matrix (e.g., an element may be zero when there is no edge between two nodes). When the system is required to perform a multiplication of the adjacency matrix with a large (e.g., two billion elements, or rows) input vector, the system may need to constantly block execution of one or more threads performing the multiplications in order to identify available addresses in a memory. A system in accordance with the present disclosure may provide an implementation of utilizing private buffers assigned to threads prior to identifying available spaces in memory, in order to reduce, or eliminate, a need for thread synchronization by threads storing respective outputs into distinct buffers and/or memory locations. Further, identification of available spaces in memory is perform in response to a buffer being full, or in response to a completion of a thread. As such, a need to block, or suspend, threads during execution, or a need for threads to communicate with each other, may be reduced, and thus reducing thread synchronization. The system may also be cache-friendly, and a reduction in thread synchronization may improve a performance of large scale analytics system.

In some examples, there may be relatively small amount of penalty in architectures such as POWER8 or Intel processors for misaligned accesses, as long as the data is maintained in caches. Typically bucket information may be held in either cache level L2 or L3 as they are written (not read) during the first phase, and efficiently streamed by prefetching during the copy phase in the first phase, and in the second phase. The system in accordance with the present disclosure is also simultaneous multithreading friendly. There is increased path length in checking for overflow in the first phase. The branch is relatively easy to predict, as the overflow happens infrequently (see line "12" in instructions 301).

Performance of large graph analytics may be limited by high latency irregular memory accesses. However, the inner loops of most graph analytics kernels can be partitioned into regions of similar, regular or irregular, access patterns. Then the order of loop iterations for these partitions can be changed to localize the memory accesses to cacheable regions of memory. A system in accordance with the present disclosure may be implemented to obtain significant speed up, even though the instruction count may increase. Thus, the processor caches may be used more efficiently resulting in significant net speedup. A system in accordance with the present disclosure may addresses several performance may address issues such as, a lack of NUMA scaling, using a different strategy based on the number of product terms of the implementation, and more effective uses of caches.

Figure 4:
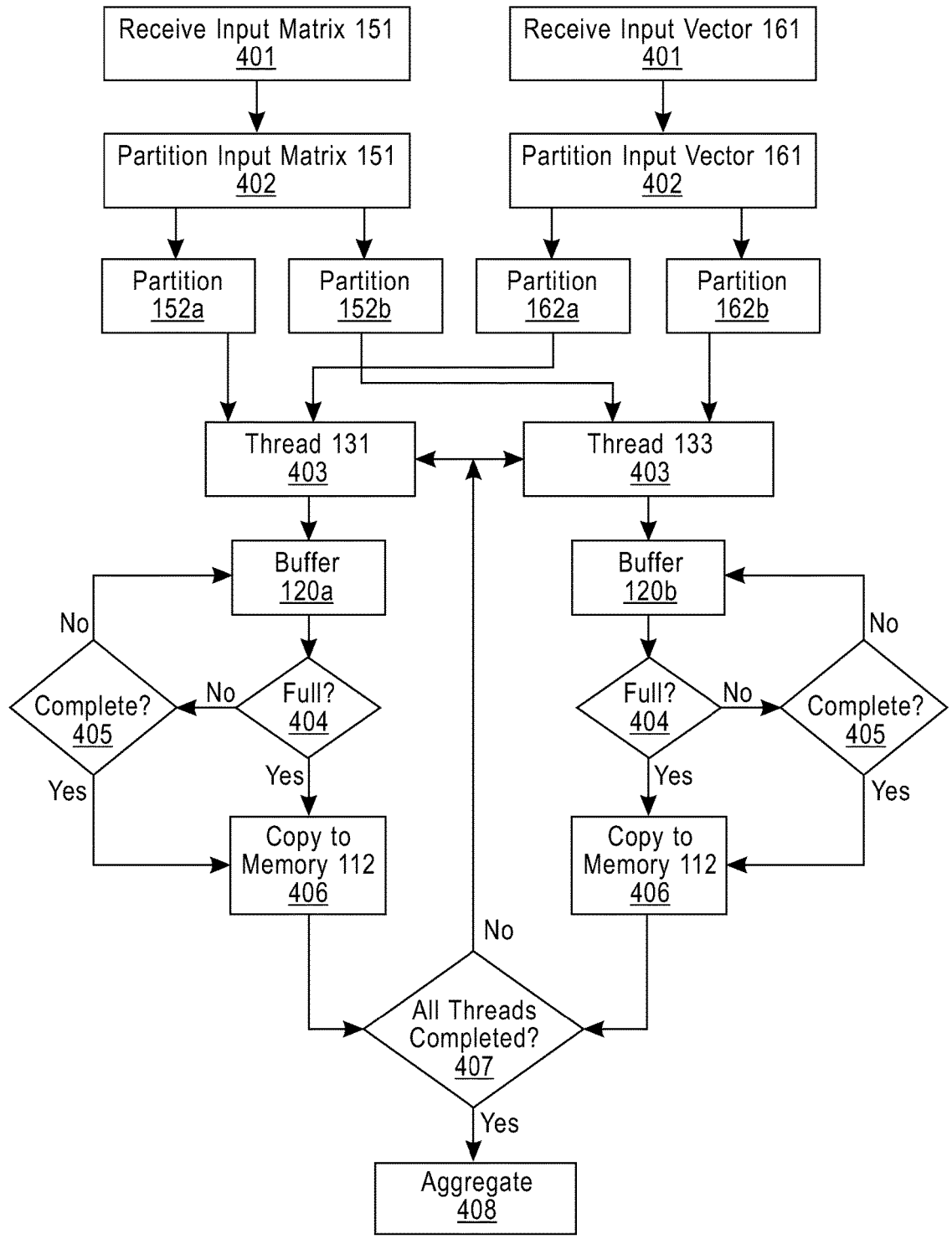
FIG. 4 illustrates a flow diagram for an example process to implement dual phase matrix-vector multiplication system.

FIG. 4 illustrates a flow diagram for an example process to implement dual phase matrix-vector multiplication system, arranged in accordance with at least some embodiments presented herein. The process in FIG. 4 could be implemented using, for example, computer system 100 discussed above. An example process may include one or more operations, actions, or functions as illustrated by one or more of blocks 401, 402, 403, 404, 405, 406, 407, and/or 408. Although illustrated as discrete blocks, various blocks may be divided into additional blocks, combined into fewer blocks, or eliminated, depending on the desired implementation.

Processing may begin at block 401, where a processor may receive input matrix data 150 and an input vector data 160. In some examples, input matrix data 150 and input vector data 160 may be stored in memory 112, such that the processor may retrieve input matrix data 150 and input vector data 10 from memory 112.

Processing may continue from block 401 to block 402. At block 402, the processor may partition input matrix data into matrix partitions 152*a*, 152*b*, and may partition input vector data 160 into vector partitions 162*a*, 162*b*.

Processing may continue from block 402 to block 403. At block 403, the processor may schedule thread 131 to multiply matrix partition 152*a* with vector partition 162*a*, and may schedule thread 133 to multiply matrix partition 152*b* with vector partition 162*b*. Thread 131 may store results from the multiplication of matrix partition 152*a* and vector partition 162*a* into buffer 120*a*. Thread 133 may store results from the multiplication of matrix partition 152*b* and vector partition 162*b* into buffer 120*b*. Threads 131, 133 may store each result into respective buffers in a sequential, and first-in-first-out, manner, and may store results that are determined without waiting for completion of execution.

Processing may continue from block 403 to block 404. At block 404, the processor may detect whether each buffer among buffers 120*a*, 120*b*, is full. In response to a buffer being full, processing may continue to block 406. In response to a buffer being not full, processing may continue to block 405.

At block 405, in response to a buffer being not full, the processor may detect whether a corresponding thread has completed execution. In response to the thread not being completed yet, the processor may continue to detect for a full buffer and the thread may continue to perform the assigned multiplication. In response to the thread being completed, processing may continue to block 406.

At block 406, the processor may copy contents of a buffer to memory 112 in response to the buffer being full, or in response to a corresponding thread completed execution. In some examples, the processor may suspend execution of a thread, if the corresponding buffer is full, prior to copy contents of the full buffer to memory 112. In some examples, the processor may resume execution of a thread upon a copying contents of a full buffer to memory 112 and if the thread has yet to be completed.

Processing may continue from block 406 to block 407. At block 407, the processor may detect whether all threads are completed. If not all threads are completed, the processor may continue to detect whether buffers 120 are full, or wait for all threads to be completed. If all threads are completed, the processor may schedule threads to aggregate the contents copied in memory 112 from buffers 120. Aggregation of the contents in memory 112 may result in generation of output vector data that corresponds to a result of multiplication between input matrix data 150 and input vector data 160.

Figure 5:
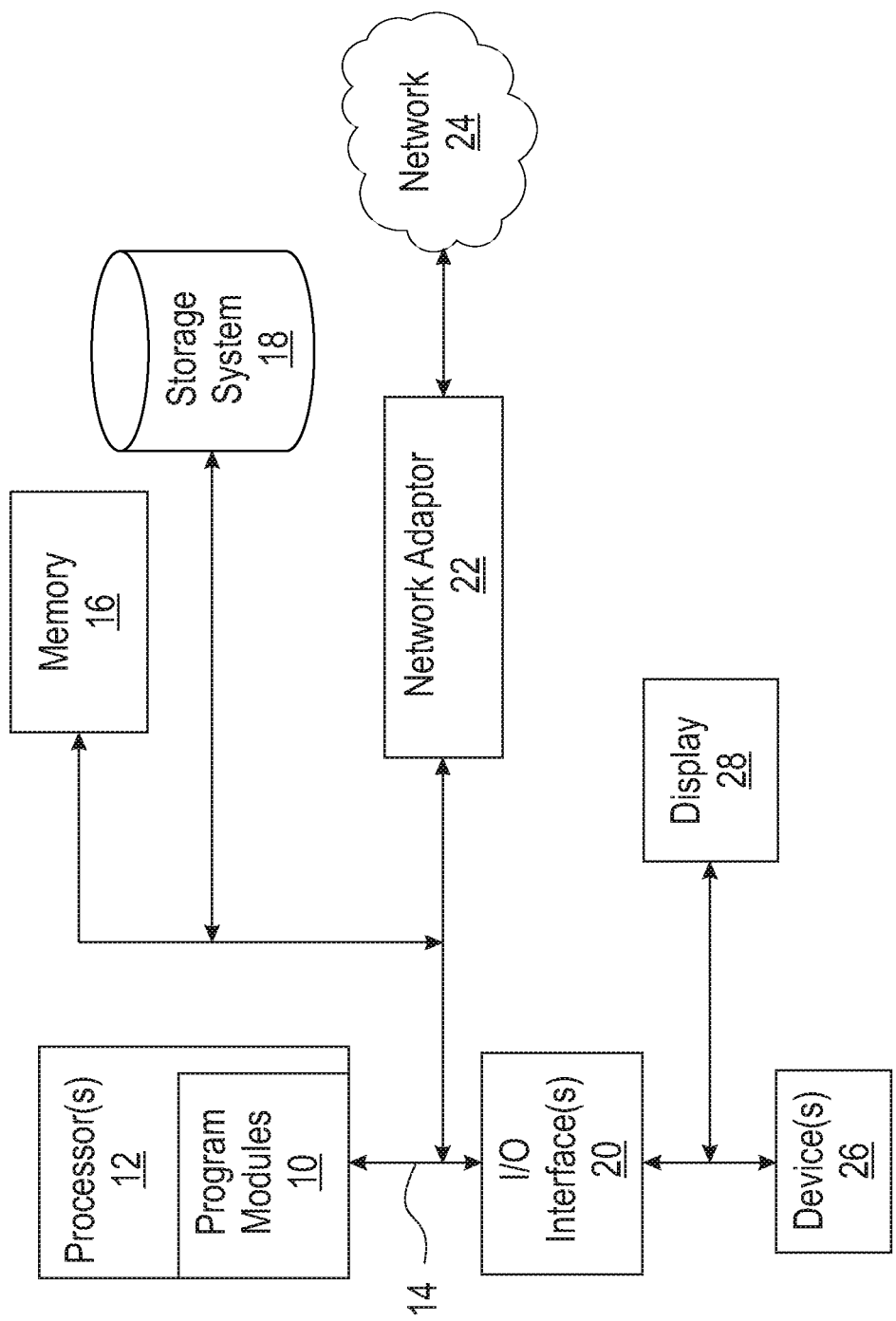
FIG. 5 is an exemplary block diagram of a computer system in which processes involved in the system, method, and computer program product described herein may be implemented.

FIG. 5 illustrates a schematic of an example computer or processing system that may implement any portion of computer system 100, processor 110, scaling module 130, aggregation module 140, memory 112, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computer system environments or configurations. Examples of well-known computer systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining an output vector associated with a multiplication between a matrix and a vector, the method comprising:
- receiving, by a processor, input matrix data that corresponds to an input matrix;
- receiving, by the processor, input vector data that corresponds to an input vector;
- partitioning, by the processor, the input vector data into at least a first vector partition and a second vector partition, wherein the first vector partition corresponds to a first range of elements in the input vector, and the second vector partition corresponds to a second range of elements in the input vector;
- partitioning, by the processor, the input matrix data into at least a first matrix partition and a second matrix partition, wherein the first matrix partition corresponds to a first range of columns of the input matrix, and the second matrix partition corresponds to a second range of columns of the input matrix;
- executing, by the processor, a first thread to determine a set of first intermediate elements, wherein the set of first intermediate elements is a result of a multiplication between the first matrix partition and the first vector partition;
- in response to determination of each first intermediate element, storing, by the processor, the determined first intermediate element into a first buffer assigned to the first thread;
- executing, by the processor, a second thread to determine a set of second intermediate elements, wherein the set of second intermediate elements is a result of a multiplication between the second matrix partition and the second vector partition;
- in response to determination of each second intermediate element, storing, by the processor, the determined second intermediate element into a second buffer assigned to the second thread;
- copying, by the processor, at least a subset of the first intermediate elements from the first buffer to a memory;
- copying, by the processor, at least a subset of the second intermediate elements from the second buffer to the memory; and
- aggregating, by the processor, the first intermediate elements and the second intermediate elements stored in the memory to generate output vector data that corresponds to an output vector, wherein the output vector is a result of multiplication between the input matrix and the input vector.

2. The method of claim 1, wherein the input matrix is a sparse matrix, and the input vector is a sparse vector.

3. The method of claim 1, wherein the assignment of the first buffer to the first thread, and assignment of the second buffer to the second thread, allows the executions of the first and second threads to continue without thread synchronization during the storage of the first intermediate elements in the first buffer and during storage of the second intermediate elements in the second buffer.

4. The method of claim 1, wherein the first vector partition and the second vector partition include nonzero elements.

5. The method of claim 1, wherein the first buffer and the second buffer are parts of one or more caches configured to be in communication with the processor.

6. The method of claim 1 further comprising, prior to copying the subset of the first intermediate elements from the first buffer to the memory:
- detecting, by the processor, that the first buffer is full, wherein the subset of the first intermediate elements is stored in the full first buffer;
- suspending, by the processor, execution of the first thread;
- identifying, by the processor, a set of addresses in the memory;
- copying, by the processor, the subset of the first intermediate elements from the full first buffer to the identified set of addresses in the memory; and
- resuming, by the processor, the execution of the first thread to determine the first intermediate elements.

7. The method of claim 6, wherein identifying the set of addresses in the memory includes determining, by the processor, a current value of a pointer stored in a register, and the method further comprising, in response to copying the subset of the first intermediate elements to the identified set of addresses in the memory, modifying, by the processor, the value of the pointer.

8. The method of claim 1, wherein executing the first thread to determine the first set of elements of the first intermediate elements includes:
- identifying, by the processor, one or more nonzero elements in the first vector partition; and
- identifying, by the processor, one or more columns among the first matrix partition that correspond to indices of the identified nonzero elements, wherein executing the first thread to determine the first intermediate elements includes performing multiplications on the identified nonzero elements of the first vector partition with the identified columns of the first matrix partition.

9. The method of claim 1, wherein copying the subset of the first intermediate elements to the memory is performed in response to a completion of execution of the first thread, and wherein copying the subset of the second intermediate elements to the memory is performed in response to a completion of execution of the second thread.

10. A system effective to determine an output vector associated with a multiplication between a matrix and a vector, the system comprises:
- a memory;
- a first buffer;
- a second buffer;
- a processor configured to be in communication with the memory, the first buffer, and the second buffer;
- a scaling module configured to be in communication with the processor, the first buffer, and the second buffer;
- an aggregation module configured to be in communication with the processor and the memory;
- the processor is configured to:
  - receive input matrix data that corresponds to an input matrix;
  - receive input vector data that corresponds to an input vector;
  - partition the input vector data into at least a first vector partition and a second vector partition, wherein the first vector partition corresponds to a first range of elements in the input vector, and the second vector partition corresponds to a second range of elements in the input vector;
  - partition the input matrix data into at least a first matrix partition and a second matrix partition, wherein the first matrix partition corresponds to a first range of columns of the input matrix, and the second matrix partition corresponds to a second range of columns of the input matrix;

the scaling module is configured to:
  execute a first thread to determine a set of first intermediate elements, wherein the set of first intermediate elements is a result of a multiplication between the first matrix partition and the first vector partition, and the first buffer is assigned to the first thread;
  in response to determination of each first intermediate element, store the determined first intermediate element into the first buffer;
  execute a second thread to determine a set of second intermediate elements, wherein the set of second intermediate elements is a result of a multiplication between the second matrix partition and the second vector partition, wherein the second buffer is assigned to the second thread;
  in response to determination of each second intermediate element, store the determined second intermediate element into the second buffer;

the processor is further configured to:
  copy at least a subset of the first intermediate elements from the first buffer to the memory;
  copy at least a subset of the second intermediate elements from the second buffer to the memory; and the aggregation module is configured to aggregate the first intermediate elements and the second intermediate elements stored in the memory to generate output vector data that corresponds to an output vector, wherein the output vector is a result of multiplication between the input matrix and the input vector.

11. The system of claim 10, wherein the input matrix is a sparse matrix, and the input vector is a sparse vector.

12. The system of claim 10, wherein the assignment of the first buffer to the first thread, and assignment of the second buffer to the second thread, allows the executions of the first and second threads to continue without thread synchronization during the storage of the first intermediate elements in the first buffer and during storage of the second intermediate elements in the second buffer.

13. The system of claim 10, wherein the first vector partition and the second vector partition include nonzero elements.

14. The system of claim 10, wherein the processor is further configured to, prior to copying the subset of the first intermediate elements from the first buffer to the memory:
  detect the first buffer is full, wherein the subset of the first intermediate elements is stored in the full first buffer;
  suspend execution of the first thread by the scaling module;
  identify a set of addresses in the memory;
  copy the subset of the first intermediate elements from the full first buffer to the identified set of addresses in the memory; and
  resume the execution of the first thread by the scaling module to determine the first intermediate elements.

15. The system of claim 10, wherein the processor is further configured to:
  identify one or more nonzero elements in the first vector partition; and
  identify one or more columns among the first matrix partition that correspond to indices of the identified nonzero elements, wherein execution of the first thread by the scaling module to determine the first intermediate elements includes multiplication on the identified nonzero elements of the first vector partition with the identified columns of the first matrix partition.

16. The system of claim 10, wherein the processor is further configured to copy the subset of the first intermediate elements to the memory in response to a completion of execution of the first thread, and copy the subset of the second intermediate elements to the memory in response to a completion of execution of the second thread.

17. A computer program product for determining an output vector associated with a multiplication between a matrix and a vector, the computer program product comprising a computer readable storage medium having program instructions embodied therewith, the program instructions executable by a device to cause the device to:
  receive input matrix data that corresponds to an input matrix;
  receive input vector data that corresponds to an input vector;
  partition the input vector data into at least a first vector partition and a second vector partition, wherein the first vector partition corresponds to a first range of elements in the input vector, and the second vector partition corresponds to a second range of elements in the input vector;
  partition the input matrix data into at least a first matrix partition and a second matrix partition, wherein the first matrix partition corresponds to a first range of columns of the input matrix, and the second matrix partition corresponds to a second range of columns of the input matrix;
  execute a first thread to determine a set of first intermediate elements, wherein the set of first intermediate elements is a result of a multiplication between the first matrix partition and the first vector partition;
  in response to determination of each first intermediate element, store the determined first intermediate element into a first buffer assigned to the first thread;
  execute a second thread to determine a set of second intermediate elements, wherein the set of second intermediate elements is a result of a multiplication between the second matrix partition and the second vector partition;
  in response to determination of each second intermediate element, store the determined second intermediate element into a second buffer assigned to the second thread;
  copy at least a subset of the first intermediate elements from the first buffer to a memory;
  copy at least a subset of the second intermediate elements from the second buffer to the memory; and
  aggregate the first intermediate elements and the second intermediate elements stored in the memory to generate output vector data that corresponds to an output vector, wherein the output vector is a result of multiplication between the input matrix and the input vector.

18. The computer program product of claim 17, wherein the input matrix is a sparse matrix, and the input vector is a sparse vector.

19. The computer program product of claim 17, wherein the program instructions are further executable by the device to cause the device to:
  detect the first buffer is full, wherein the subset of the first intermediate elements is stored in the full first buffer;
  suspend execution of the first thread;
  identify a set of addresses in the memory;
  copy the subset of the first intermediate elements from the full first buffer to the identified set of addresses in the memory; and resume the execution of the first thread to determine the first intermediate elements.

20. The computer program product of claim 17, wherein the assignment of the first buffer to the first thread, and assignment of the second buffer to the second thread, allows the executions of the first and second threads to continue without thread synchronization during the storage of the first intermediate elements in the first buffer and during storage of the second intermediate elements in the second buffer.

* * * * *